US007845627B2

(12) United States Patent
Hommochi et al.

(10) Patent No.: US 7,845,627 B2
(45) Date of Patent: Dec. 7, 2010

(54) BOOKBINDING APPARATUS AND IMAGE FORMING SYSTEM

(75) Inventors: Hiroki Hommochi, Moriya (JP); Toshiaki Nochi, Joso (JP)

(73) Assignee: Canon Finetech Inc., Misato-shi (JP)

(*) Notice: Subject to any disclaimer, the term of this patent is extended or adjusted under 35 U.S.C. 154(b) by 2 days.

(21) Appl. No.: 12/134,608

(22) Filed: Jun. 6, 2008

(65) Prior Publication Data

US 2008/0308992 A1 Dec. 18, 2008

(30) Foreign Application Priority Data

Jun. 12, 2007 (JP) ............................ 2007-155166

(51) Int. Cl.
*B65H 33/04* (2006.01)
*B65G 39/00* (2006.01)

(52) U.S. Cl. ............... 270/58.07; 270/58.08; 270/58.23

(58) Field of Classification Search ............. 270/58.07, 270/58.08, 58.23
See application file for complete search history.

(56) References Cited

U.S. PATENT DOCUMENTS 7,568,687 B2 * 8/2009 Sasamoto ................ 270/58.07
2007/0035081 A1 * 2/2007 Kaneko et al. ........... 270/58.09
2007/0085256 A1 * 4/2007 Miyake et al. ........... 270/52.18
2007/0212199 A1 * 9/2007 Sasamoto ...................... 412/9

FOREIGN PATENT DOCUMENTS

JP 2003-292230 A 10/2003
JP 2003292230 A * 10/2003

* cited by examiner

*Primary Examiner*—Gene Crawford
*Assistant Examiner*—Yolanda Cumbess
(74) *Attorney, Agent, or Firm*—Fitzpatrick, Cella, Harper & Scinto

(57) ABSTRACT

A bookbinding apparatus including: a gathering tray device that collates sheets sequentially fed thereto into a sheet bundle; a sheet bundle conveying device that conveys the sheet bundle collated by the gathering tray device to an adhesive coating position located downstream of the gathering tray device; an adhesive coating device that coats the sheet bundle located at the adhesive coating position with an adhesive; a cover sheet stitching device that stitches a cover sheet with the sheet bundle; and a control device that controls a bookbinding process executed by the sheet bundle conveying device, the adhesive coating device, and the cover sheet stitching device, wherein, upon receiving a bookbinding process stopping signal before the sheet bundle is coated with the adhesive by the adhesive coating device, the control device controls the adhesive coating device to coat the sheet bundle in process with the adhesive.

4 Claims, 7 Drawing Sheets

BOOKBINDING APPARATUS AND IMAGE FORMING SYSTEM

BACKGROUND OF THE INVENTION

1. Field of the Invention

The present invention relates to a bookbinding apparatus that coats a collated sheet bundle such as a document with an adhesive, and to an image forming system including the bookbinding apparatus, and more specifically, to a bookbinding apparatus that has a unique sheet bundle process in the case where a job is stopped (discontinued) in a bookbinding process, and to an image forming system including the bookbinding apparatus.

2. Description of the Related Art

In general, there has been widely known an apparatus having a structure in which sheets conveyed from an image forming apparatus or the like are stacked into a bundle, followed by collation of the bundle of the sheets, a spine-stitched end surface of such a sheet bundle is coated with an adhesive, the sheet bundle is then bound with a cover sheet fed from a route different from that for the sheet bundle, and automatically performs a bookbinding design for the bound sheet bundle and cover sheet. In particular, recently, there has been widely used a printing system that, as needs arise, forms an image on the sheets by the image forming apparatus, followed by collation of the sheets, and binds the cover sheet with such a collated sheet bundle, thereby performing a bookbinding finishing for the bound cover sheet and sheet bundle into a book form.

Specifically, for example, as disclosed in Japanese Patent Application Laid-Open No. 2003-292230, the sheets sequentially conveyed from the image forming apparatus are stacked on a tray, followed by collation thereof, the bundle of the sheets thus collated is conveyed to an adhesive coating position, and at this position, the spine-stitched end surface of the sheet bundle is coated with the adhesive. After that, the sheet bundle is bound with the cover sheet fed through another route, and the adhesive solidifies, thereby performing bookbinding for the bound cover sheet and sheet bundle.

Incidentally, in the bookbinding apparatus as described above, for example, in a case where the cover sheet conveyed through the another route than that for the sheet bundle runs out during the bookbinding, a bookbinding process (job) is sometimes stopped at a stage before the sheet bundle is subjected to the bookbinding.

In the above-mentioned conventional bookbinding apparatus, for example, in the case where the bookbinding process is stopped in a state where multiple sheets are discharged to a gathering tray and are collated thereon, the sheets discharged on the gathering tray are sometimes placed in an unbundled manner, so there are problems in that it is difficult to pick up the sheets and in that operability of the bookbinding apparatus is poor.

Further, in the case where the job is stopped at the stage before the sheet bundle reaches the adhesive coating position, the sheet bundle is sometimes in a state of being grasped by grippers and the like. Then, the sheet bundle is fallen into the bookbinding apparatus in the case of performing jam clearance, and in such a way, there is a problem in that operability of the bookbinding apparatus in the jam clearance is also poor. In particular, when a high-temperature adhesive coating portion is located in the vicinity of an operator when the sheet bundle is processed, then a problem occurs on safety of the operator. Accordingly, it is necessary to install parts and devices for hiding the high-temperature adhesive coating portion, leading to such a demerit as complication of a structure.

SUMMARY OF THE INVENTION

The present invention has been made focusing attention to the problems described above. It is an object of the present invention to provide a bookbinding apparatus capable of enhancing the operability for the jam clearance and the like when the job is stopped in the bookbinding process, and to provide an image forming system including the bookbinding apparatus.

In order to achieve the above-mentioned object, a bookbinding apparatus according to an embodiment of the present invention includes: a gathering tray device that collates sheets sequentially fed thereto into a sheet bundle; a sheet bundle conveying device that conveys the sheet bundle collated by the gathering tray device to an adhesive coating position located downstream of the gathering tray device; an adhesive coating device that coats the sheet bundle located at the adhesive coating position with an adhesive; a cover sheet stitching device that stitches a cover sheet with the sheet bundle; and a control device that controls a bookbinding process executed by the sheet bundle conveying device, the adhesive coating device, and the cover sheet stitching device; in which, upon receiving a bookbinding process stopping signal before the sheet bundle is coated with the adhesive by the adhesive coating device, the control device controls the adhesive coating device to coat the sheet bundle in process with the adhesive.

According to the above-mentioned bookbinding apparatus, even in the case where the bookbinding process stopping signal is generated during a bookbinding process operation, processes up to a process for coating the adhesive are executed for the sheet bundle in process. Accordingly, the sheet bundle is not brought apart in the apparatus, so the operability at the time of the jam clearance is improved.

The above-mentioned bookbinding apparatus may further include: a stacking portion on which the sheet bundle stitched with the cover sheet by the cover sheet stitching device are stacked; and a sheet bundle discharging device that discharges the sheet bundle coated with the adhesive to the stacking portion, in which the control device may control the sheet bundle discharging device to discharge to the stacking portion the sheet bundle coated with the adhesive without being stitched with the cover sheet.

As described above, in the case of adopting a configuration including the stacking portion of the sheet bundle, the sheet bundle is discharged to the stacking portion in a state where the sheet bundle is coated with the adhesive, thus making it possible to perform the jam clearance at the stacking portion.

Note that, upon receiving the bookbinding process stopping signal in a state where sheets of a number smaller than a predetermined number are gathered on the gathering tray device, the control device may control the adhesive coating device to coat a bundle of the sheets of the number smaller than the predetermined number with the adhesive.

Alternatively, the control device may control the adhesive coating device to coat the sheet bundle in process with the adhesive, which has been already conveyed from the gathering tray device. Specifically, the control device may be configured not to perform the adhesive coating process for the sheet bundle in the case where the bookbinding process stopping signal is generated in the state where the sheet bundle is gathered on the gathering tray device.

With such configurations, it becomes possible to perform the jam clearance for the sheets (sheet bundle) gathered on the gathering tray device without doing any other actions.

Further, the above-mentioned bookbinding apparatus may be connected to an image forming apparatus including an image forming portion that sequentially forms an image on sheets, and a discharging device that discharges the sheets on which the image has been formed, thereby constructing an image forming system.

Further features of the present invention will become apparent from the following description of exemplary embodiments with reference to the attached drawings.

DESCRIPTION OF THE EMBODIMENTS

A description is specifically made below of a preferred embodiment of the present invention with reference to the accompanying drawings.

Figure 1:
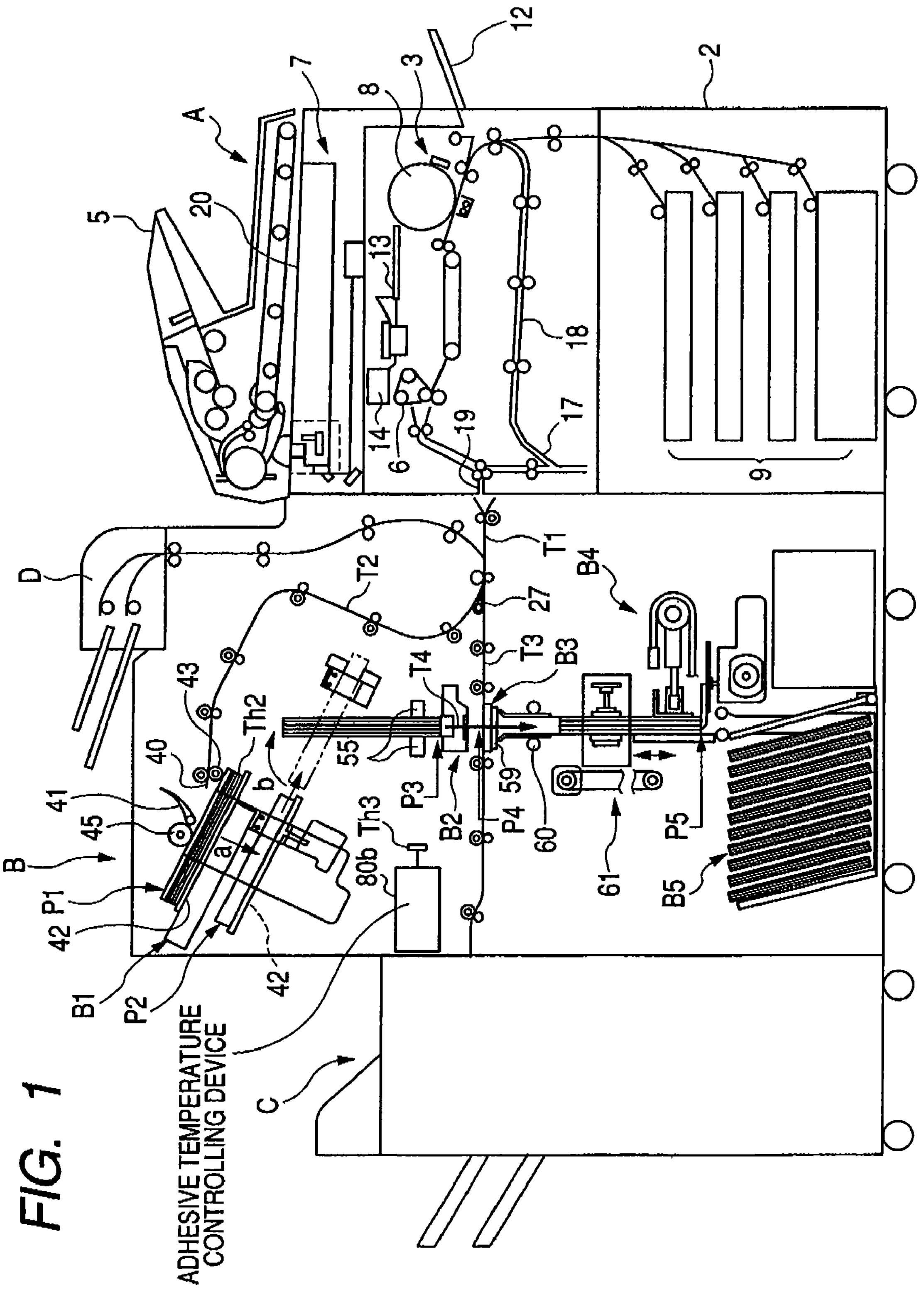
FIG. 1 is a view illustrating an overall configuration of an image forming system including a bookbinding apparatus according to the present invention.
Figure 2:
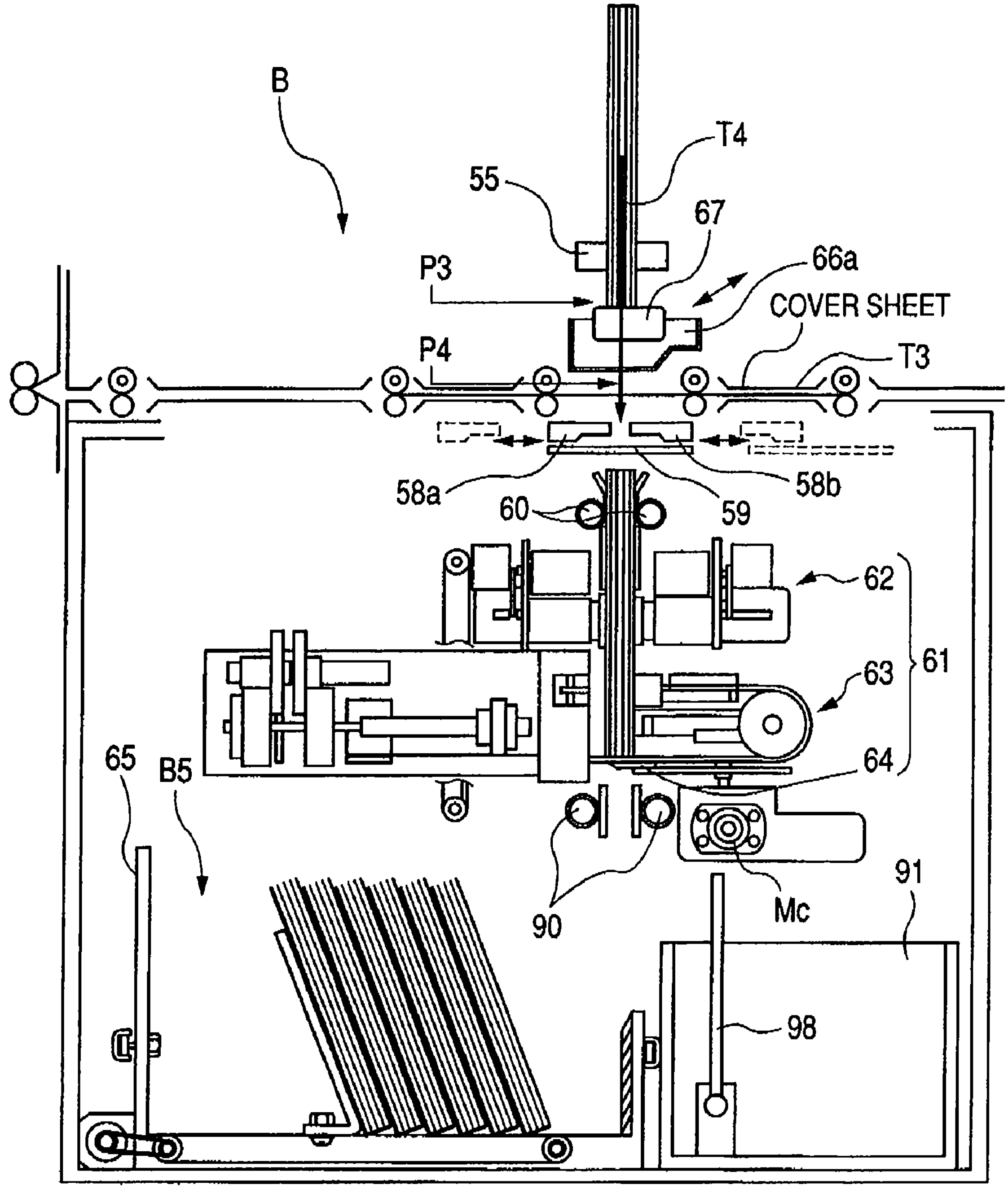
FIG. 2 is a view illustrating an internal configuration of the bookbinding apparatus in the image forming system illustrated in FIG. 1.
Figure 3A:
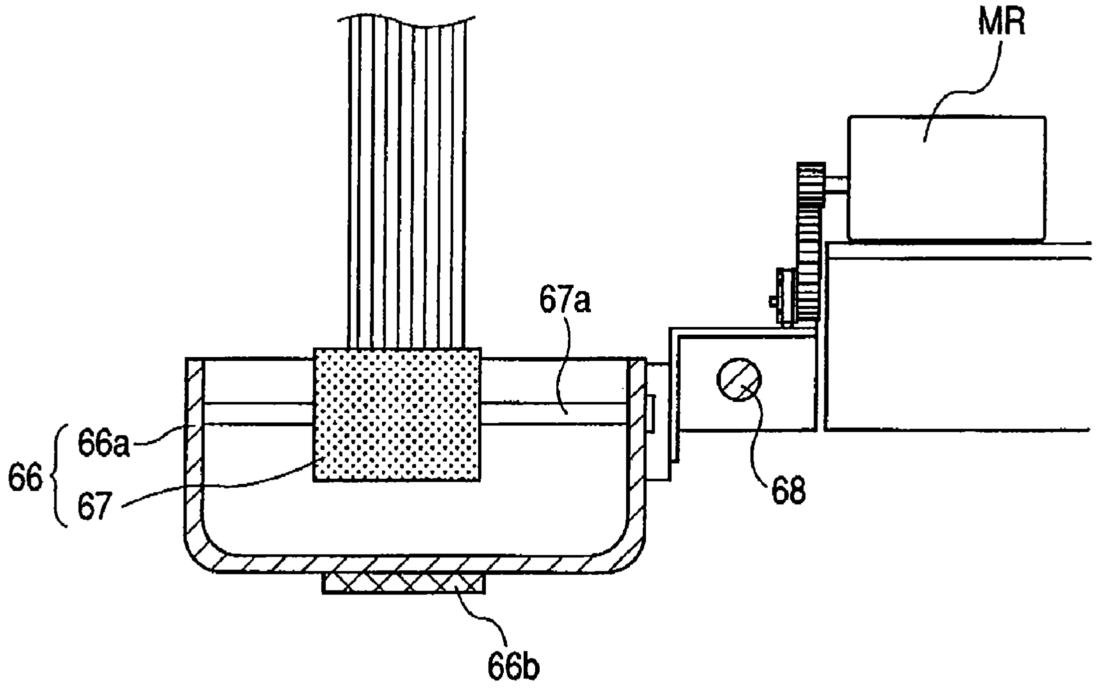
FIG. 3A is a front cross-sectional view illustrating a configuration of an adhesive container disposed in the bookbinding apparatus.
Figure 3B:
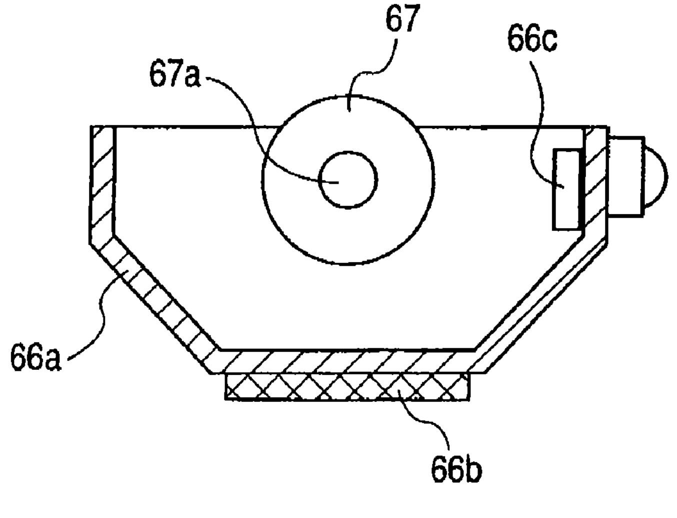
FIG. 3B is a side cross-sectional view of the adhesive container illustrated in FIG. 3A.
Figure 4:
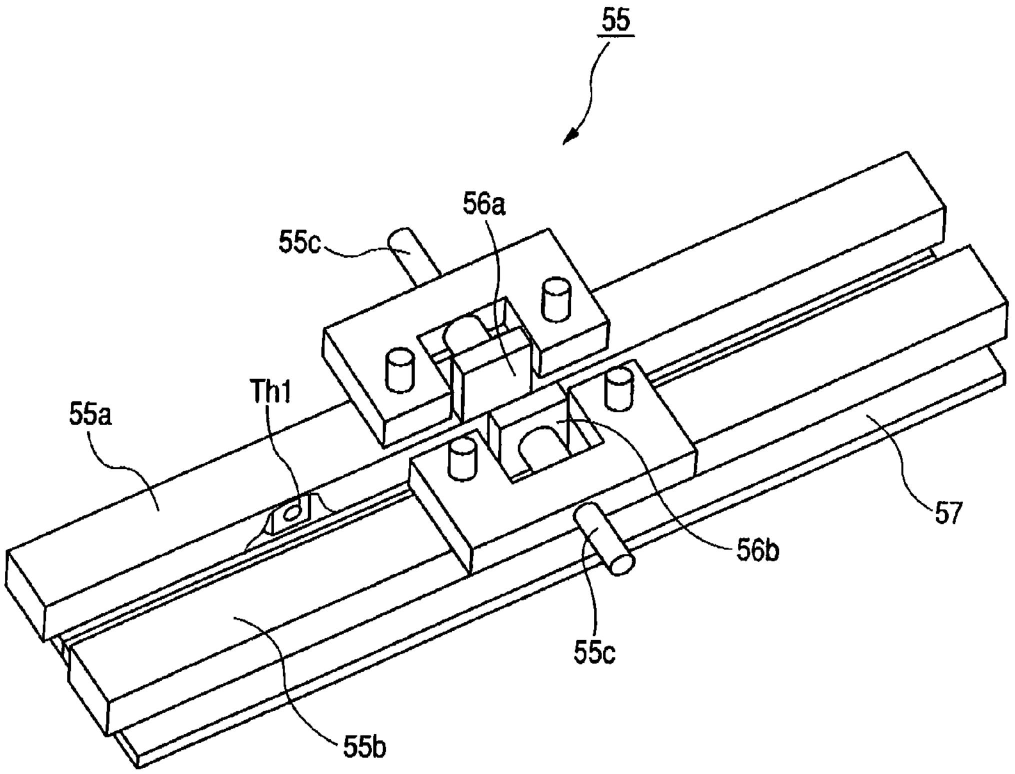
FIG. 4 is a view illustrating gripper members of a sheet bundle conveying device disposed in the bookbinding apparatus.
Figure 5:
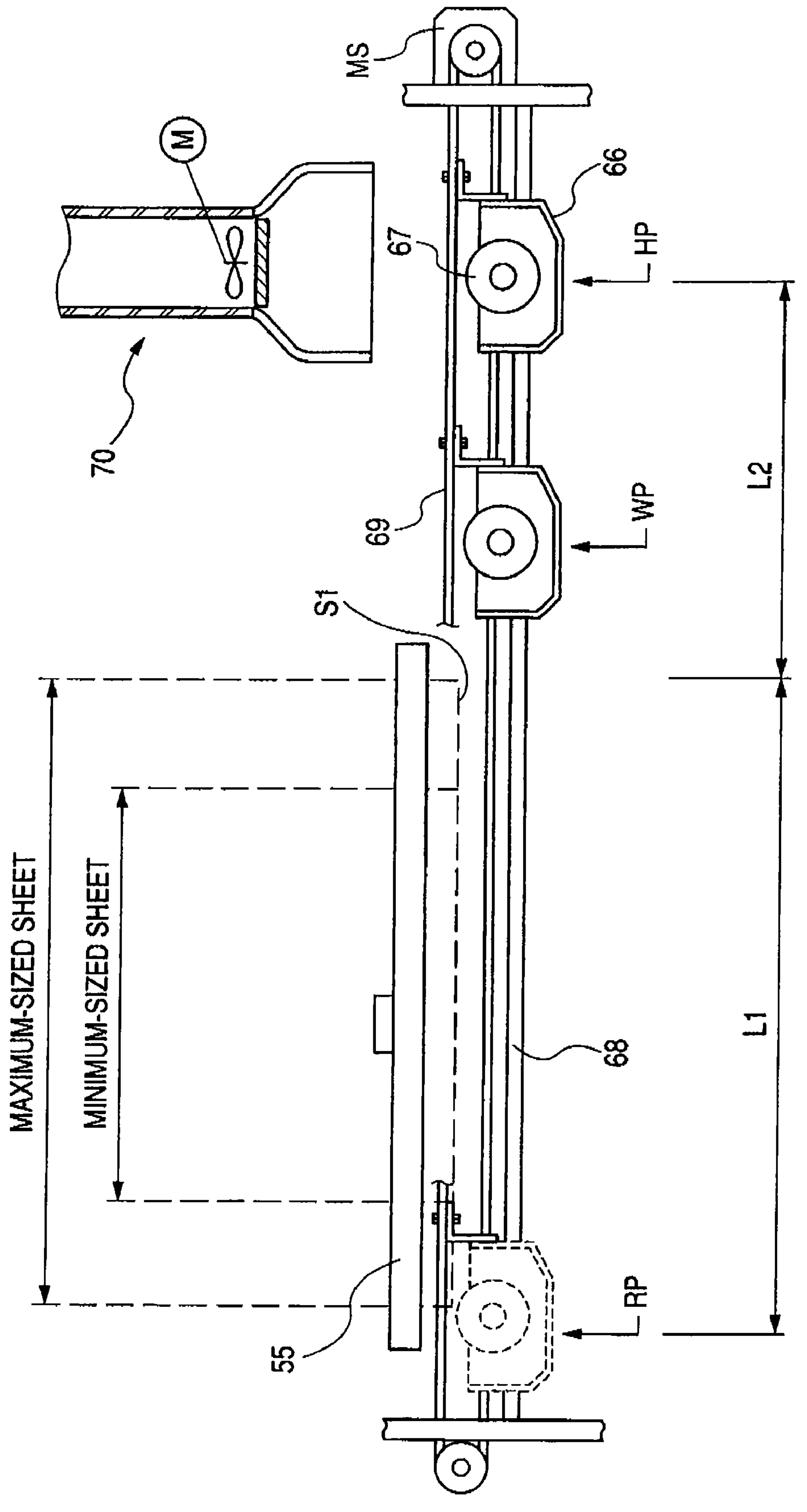
FIG. 5 is a view explaining a shift structure of moving the adhesive container illustrated in FIGS. 3A and 3B along a sheet bundle.

FIG. 1 is a view illustrating an overall configuration of an image forming system including a bookbinding apparatus according to the present invention. FIG. 2 is a view illustrating an internal configuration of the bookbinding apparatus in the image forming system illustrated in FIG. 1. FIGS. 3A and 3B are views individually illustrating a configuration of an adhesive container disposed in the bookbinding apparatus. FIG. 4 is a view illustrating a configuration of gripper members of a sheet bundle conveying device disposed in the bookbinding apparatus. FIG. 5 is a view describing a shift structure of moving the adhesive container illustrated in FIGS. 3A and 3B along a sheet bundle.

The image forming system of this embodiment, which is illustrated in FIG. 1, includes: an image forming apparatus (copier in the illustrated example) A; a bookbinding apparatus (bookbinding unit) B connected to a sheet discharging port 19 of a sheet discharging device of the image forming apparatus A; and a sheet processing apparatus (sheet processing unit) C disposed downstream of the bookbinding apparatus B. The image forming system is adapted so as to automatically perform a bookbinding process for sheets, on which an image has been formed by the image forming apparatus A, by the bookbinding apparatus B, or so as to automatically process the sheets by the sheet processing apparatus C.

The image forming apparatus A illustrated in FIG. 1 includes: an image forming portion 3 that is provided in a casing 2 and sequentially forms the image on the sheets; an image capture device (scanner unit) 7 mounted in an upper portion of the casing 2; and a document feeding apparatus (ADF unit) 5.

The image forming portion 3 disposed in the casing 2 sequentially forms the image on the sheets, such as plain paper sheets and OHP sheets, which are fed from a sheet feeding portion 9. In the image forming portion 3, an electrostatic latent image is formed on a photosensitive drum 8 by an exposure device 13, a toner is adhered onto the electrostatic latent image by a developing device, and a toner image is transferred by a transfer device onto the sheets fed from the sheet feeding portion 9. This toner image is fixed onto the sheets by a fixing device 6, and the sheets are taken out of the sheet discharging port 19 of the sheet discharging device. Further, in the case of double-sided printing in which images are formed on front and back surfaces of the sheets, the surfaces of the sheets, on one-side surfaces of which the image has been printed, are inverted in a switchback route 17, and the sheets are then sent from a circulation route 18 again to the photosensitive drum 8. After that, the image is printed on the back surfaces of the sheets there, and the sheets are taken out of the sheet discharging port 19. Note that, in FIG. 1, a manual feeding port 12 for the sheets feeds millboards such as cover sheets, and special sheets such as coating sheets.

In the upper portion of the casing 2, the image capture device (the scanner unit) 7 is disposed. This image capture device 7 scans an original, which is mounted on a platen 20, by a photoelectric conversion element, and transfers image data thus obtained to a data storage portion 14 of the image forming portion 3. Further, to the image capture device 7, the document feeding apparatus (the ADF unit) 5, which automatically feeds originals onto the platen 20, is attached. This original feeding apparatus 5 separates the originals set on an original feeding tray one by one, and automatically feeds the separated originals onto the platen 20. Note that, while the image forming apparatus A as described above is widely used, and those with various structures are known, a printing mode for use is not limited to an electrostatic printing mode of FIG. 1, and a screen printing mode, an inkjet printing mode, and the like are adoptable.

The bookbinding apparatus B is connected to the image forming apparatus A. The sheets sequentially discharged from the sheet discharging port 19 are conveyed toward a gathering tray device to be described later.

As illustrated in FIG. 1, the bookbinding apparatus B includes: a gathering portion B1 that gathers the sheets into a bundle and collates such a sheet bundle; an adhesive coating portion B2 that coats the sheet bundle with a glue (an adhesive); a cover sheet stitching portion B3 that stitches the cover sheet to the sheet bundle; a trimming cutting portion B4 that cuts a peripheral edge of the bound cover sheet; and a containing stack portion (a stacking portion) B5 that contains the multiple sheet bundles.

The bookbinding apparatus B receives the sheets, on which the image is formed, from a sheet loading route T1 connected to the sheet discharging port 19 of the image forming apparatus A, and gathers a series of the sheets into the bundle and aligns the sheet bundle by the gathering portion B1. Then, the bookbinding apparatus B implements an adhesive coating process for one side edge (a spine portion) of the sheet bundle by the adhesive coating portion B2, and stitches the sheet bundle together with the cover sheet by the cover sheet stitching portion B3, thereby forming book-like sheets. After that, by the trimming cutting portion B4, the bookbinding apparatus B cuts and finishes peripheral edges of the book-like sheets, and then contains the book-like sheets in the containing stack portion B5. A series of the bookbinding process is implemented in the above-mentioned way.

Further, the bookbinding apparatus B includes: the sheet loading route T1 connected to the sheet discharging port 19 of the image forming apparatus A; a bookblock sheet conveying route T2 connected to the sheet loading route T1; and a cover sheet conveying route T3. By a route switching piece 27, the bookbinding apparatus B distributes and conveys the sheets which are conveyed from the image forming apparatus A. Further, a bookbinding route T4 is provided downstream of the bookblock sheet conveying route T2 through the gathering portion B1, and the bookbinding route T4 intersects (perpendicularly in the illustrated example) the cover sheet conveying route T3.

Note that an inserter apparatus D that supplies the sheets selectively with the image forming apparatus A is provided upstream of the sheet loading route T1. One or multiple stages of trays are prepared in the inserter apparatus D, and the inserter apparatus D is adapted so as to separate one by one the bundles of the sheets (that is, the cover sheets and bookblock sheets) set on the trays, and to supply the cover sheets or the bookblock sheets from a feeding route to the sheet loading route T1.

The gathering portion B1 includes, for example, a gathering tray 42 constituting the gathering tray device that collates the sheets, which are sequentially fed thereto, into the bundle. The gathering tray 42 is disposed adjacent to a discharge port 40 of the bookblock sheet conveying route T2 while forming a vertical step difference. The gathering tray 42 illustrated in FIG. 1 is disposed downstream of the discharge port 40 so as to stack and contain the sheets, which come from the discharge port 40, in a substantially horizontal posture. Above the gathering tray 42, there are installed a loading guide 41, a loading roller 45 rotatable forward and reverse, and a trailing edge regulating member 43, and a configuration is adopted so as to guide the sheets, which come from the discharge port 40, onto the tray by the loading guide 41, and to load the guided sheets thereonto by the loading roller 45. Further, the trailing edge regulating member 43 includes a thrusting/regulating surface that thrusts trailing edges of the sheets thereto and regulates positions of the trailing edges. In particular, the trailing edge regulating member 43 illustrated in FIG. 1 is disposed so as to positionally regulate an end surface of the gathered sheet bundle, which is to be coated with an adhesive in a subsequent step, and aligns the sheets to the thrusting/regulating surface by reverse rotation of the loading roller 45.

Although not illustrated, an aligning device that aligns side edges of the sheets is provided in the gathering tray 42, and regulates the sheets, which are loaded from the discharge port 40, so that the sheets can be centered crosswise with respect to a conveying direction thereof, thereby aligning the sheets in a width direction thereof. For example, the aligning device includes, on an upper portion of the tray, a pair of aligning members engaged with both of left and right side edges of the sheets. The left and right aligning members can reciprocate by the same stroke toward a center of the sheets (reference line) in the case of aligning the sheets with respect to the center. Alternatively, in the case of aligning the sheets with respect to one-side side edges thereof, one of the aligning members can be fixed to a reference position on such a one-side side edge position, and the aligning member on an opposites side can reciprocate.

The gathering tray 42 is provided with a temperature sensor Th2 that detects a temperature of the sheet bundle stacked on the gathering tray 42.

The gathering tray 42 structured as described above is attached to an apparatus frame so as to freely ascend and descend along a direction illustrated by an arrow "a" of FIG. 1, and moves between an upper gathering position P1 and a lower taking-out position P2. The gathering tray 42 is moved from the gathering position P1 to the taking-out position P2 apart therefrom, whereby, at the taking-out position P2, the sheet bundle collated in the gathering tray 42 is passed to a sheet bundle conveying device 55 that conveys the sheet bundle to an adhesive coating position. Such a moving configuration of the gathering tray 42 is adopted for the purpose of passing the sheet bundle in the above-mentioned way. The gathering tray 42 is disposed as described above, thus making it possible to compactly constitute the device, and further, making it possible to pass the sheet bundle, which is aligned on the tray, to the sheet bundle conveying device 55 in a state of being arrayed in good order. Further, to a downstream side of the gathering tray 42, the bookbinding route T4 to which the sheet bundle is conveyed by the sheet bundle conveying device 55 is connected.

Note that the sheet bundle conveying device 55 has a function to convey the sheet bundle, which is collated by the gathering tray 42, to the adhesive coating position located downstream thereof, and to set the sheet bundle at the adhesive coating position (to hold the sheet bundle at the adhesive coating position) The sheet bundle conveying device 55 changes an orientation of the sheet bundle, which is gathered on the gathering tray 42, from the substantially horizontal posture to a vertical posture (in a direction denoted by an arrow "b" of FIG. 1), and conveys the sheet bundle to an adhesive coating position P3 of the bookbinding route T4.

For this purpose, the sheet bundle conveying device 55 includes, for example, a pair of the gripper members which grip the front and back of the sheet bundle, and a unit frame (not shown) that supports the gripper members and turns by approximately 90 degrees. The unit frame is axially supported on the apparatus frame so as to be freely rotatable in the direction denoted by the arrow "b" of FIG. 1, and can turn by approximately 90 degrees by a turning motor (not shown).

For example, as illustrated in FIG. 4, the pair of gripper members which constitute the sheet bundle conveying device 55 includes main grippers **55*a* and 55*b* and sub grippers 56*a* and 56*b*. In this case, the main grippers 55*a* and 55*b* include long plate-like members so as to grip the adhesive-coated end surface (spine portion of the sheet bundle) of the sheet bundle across the overall length thereof. The sub grippers 56*a* and 56*b* are axially supported, so as to be freely swingable, by a rotation shaft 55*c* on the main grippers 55*a* and 55*b* at a center portion of the sheet bundle. The main grippers 55*a* and 55*b* and the sub grippers 56*a* and 56*b*** are brought into pressure contact with the sheet bundle and to be separated therefrom by a grip motor (not shown).

The sheet bundle conveying device 55 includes the main and sub grippers as described above, thus making it possible to correct skew of such a lower end edge of the sheet bundle in the case of conveying the sheet bundle from the gathering tray 42 to the adhesive coating position P3 located downstream thereof by both of the grippers. Specifically, the lower end edge (the adhesive-coated end surface) of the sheet bundle is thrust to a route guide plate 57 (illustrated in FIG. 4) of the cover sheet conveying route T3 in a state where the main grippers **55*a* and 55*b* are released, the posture of the sheet bundle is corrected along the route guide plate 57, and the sheet bundle is gripped by the main grippers 55*a* and 55*b*. In order to correct the skew in the above-mentioned way, the sub grippers 56*a* and 56*b* are axially supported on the main grippers 55*a* and 55*b* so as to be swingable in the sheet width direction, and further, the route guide plate 57 is adapted so as to serve as a reference (parallel to a moving direction of an adhesive coating roll to be described later) of the posture of the sheet bundle coated with the adhesive. Note that the route guide plate 57 is adapted to retreat apart from the bookbinding route T4** after correcting the skew.

In the sheet bundle conveying device 55, bundle thickness detecting devices (not shown) which detect a thickness of the sheet bundle are provided. The bundle thickness detecting devices are arranged on movable members of the main grippers 55*a* and 55*b* or the sub grippers 56*a* and 56*b*, and detect distances by which the grippers move from release positions (home positions) to nipping positions of abutting on the surfaces of the sheet bundle by, for example, variable voltage transformer sensors, and thereby detect the thickness of the bundle. Information on the thickness of the sheet bundle, which is detected as described above, is used for a control of a subsequent operation such as, for example, adjustment of a coating amount of the adhesive depending on the thickness of the sheet bundle.

The sheet bundle conveying device 55 is provided with a temperature sensor Th1 that detects a temperature of the sheet bundle.

Next, a description is made of a configuration of the above-mentioned adhesive coating portion B2.

The adhesive coating portion B2 is disposed at the adhesive coating position P3 of the bookbinding route T4, and includes an adhesive coating device that coats the sheet bundle set on the adhesive coating position with the adhesive. For example, the adhesive coating device includes an adhesive container 66, a coating roll 67 built in the adhesive container, and a container moving device that moves the adhesive container along the adhesive-coated end surface of the sheet bundle for the purpose of performing a coating operation.

In the bookbinding apparatus B, a temperature sensor Th3 that detects a temperature (an environmental temperature in the apparatus) in the bookbinding apparatus B is provided. An adhesive temperature control device 80*b* sets and controls an adhesive temperature (a temperature set by a heater) based on the temperature of the sheet bundle or on the environmental temperature in the apparatus, which is detected by the temperature sensor Th3.

As illustrated in FIGS. 3A and 3B, the adhesive container 66 includes a container main body 66*a* that houses a hot melt adhesive, and the coating roll 67, the adhesive container 66 is filled with a solid adhesive, and the sheet bundle is coated with the adhesive by using the coating roll 67, the adhesive being heated and melted. A heater (a heating device) 66*b* such as, for example, an electric heater is built in the container main body 66*a*, and melts and liquefies the adhesive in the container. Further, a rotator (not shown) that stirs the adhesive is built in the container main body 66*a*. A current is supplied to the heater 66*b* based on a detected temperature from an adhesive temperature sensor 66*c* installed on an inner wall of the container, and the stirring rotator operates so as to uniform the adhesive temperature in the container.

The coating roll 67 is formed of heat-resistant rubber with impregnation properties, and is axially supported on the container main body 66*a* so as to be freely rotatable by a rotation shaft 67*a*. To the rotation shaft 67*a*, a roll rotating motor MR is coupled. The adhesive container 66 structured as described above is fitted to and supported on a guide rail 68. In this case, as illustrated in FIG. 5, the guide rail 68 is provided on the apparatus frame, and is disposed parallel to and along an adhesive-coated end surface S1 of the sheet bundle set by the sheet bundle conveying device 55. The adhesive container 66 that builds the coating roll 67 therein as described above is supported so as to be capable of reciprocating along the adhesive-coated end surface S1 of the sheet bundle, and is fixed to a timing belt 69 extended in a tensioned state along the guide rail 68. A shift motor MS is coupled to the timing belt 69, the container moving device includes the guide rail 68, the timing belt 69 and the shift motor MS, and the adhesive container 66 is driven to reciprocate along the guide rail.

The adhesive container 66 includes a coating region L1 where the adhesive-coated end surface S1 of the sheet bundle is coated with the adhesive and a retreating region L2 provided so that the adhesive container 66 can be moved to a retreating position (home position HP of FIG. 5) spaced at an interval from the region L1. The adhesive container 66 reciprocates among the home position HP, a waiting position WP and a return position RP by the shift motor MS. Note that the adhesive container 66 is located at the home position HP at the time when the apparatus is started up, and a suction device 70 is disposed at the home position HP. At the waiting position WP, the adhesive container 66 is positioned for the preparation for coating a subsequent sheet bundle with the adhesive in the case of continuously coating the sheet bundles with the adhesive. Accordingly, it is preferable that the waiting position WP be located in the vicinity of the adhesive coating region L1. Further, it is preferable that the return position RP be also placed in the vicinity of the adhesive coating region L1 in a similar way.

In the above-mentioned configuration, the adhesive-coated end surface S1 of the sheet bundle may be coated with the adhesive by the coating roll 67 in the case where the adhesive container 66 moves from the waiting position WP to the return position RP. However, in the configuration illustrated in FIG. 5, the adhesive-coated end surface S1 is coated with the adhesive through both of an approach stroke and return stroke of the adhesive container 66. Specifically, through the approach stroke (where the adhesive container 66 moves from WP to RP), the coating roll 67 presses and loosens the end surface S1 of the sheet bundle, and through the return stroke (where the adhesive container 66 moves from RP to WP), the coating roll 67 coats the adhesive-coated end surface S1 of the sheet bundle with the adhesive. In this case, a gap between a surface of the coating roll 67 and the adhesive-coated end surface S1 of the sheet bundle is adjusted so that the coating amount can be large when the sheet bundle is thick and can be small when the sheet bundle is thin. This adjustment for the coating amount of the adhesive is performed based on a sheet conveying amount of the sheet bundle conveying device 55.

Next, a description is made of a configuration of the above-mentioned cover sheet stitching portion B3.

As illustrated in FIG. 1 and FIG. 2, in the bookbinding route T4, a cover sheet stitching position P4 is provided downstream of the adhesive coating position P3. At the cover sheet stitching position P4, the cover sheet conveying route T3 is disposed in a direction perpendicular to the bookbinding route T4. At the cover sheet stitching position P4 located on an intersection of the cover sheet conveying route T3 and the bookbinding route T4, for example, spine folding plates 58*a* and 58*b* and a spine abutment plate 59, which constitute a cover sheet stitching device that stitches the cover sheet with the sheet bundle, are arranged.

The spine folding plates 58*a* and 58*b* include a pair of left and right plate-like members with the bookbinding route T4 interposed therebetween. The spine folding plates 58*a* and 58*b* are provided so as to be freely movable between positions (retreating positions) of being separated from each other and operating positions of abutting on each other, and are coupled to a press motor (not shown).

Further, the spine abutment plate 59 is disposed so as to be freely movable between a retreating position of retreating from the bookbinding route T4 and an operating position of entering the route. The spine abutment plate 59 is coupled to an actuator (not shown) such as an electromagnetic solenoid. Then, the sheet bundle, which has been coated with the adhesive by the above-mentioned coating roll 67, is conveyed to the cover sheet stitching position P4 by the sheet bundle conveying device 55. At this time, a state is already brought, where the cover sheet is fed and set from the cover sheet conveying route T3 to the cover sheet stitching position P4. At this time, the sheet bundle is transferred from the bookbinding route T4 to the cover sheet stitching position P4 in a state where the spine folding plates 58*a* and 58*b* are located at the retreating positions and the spine abutment plate 59 is located at the operating position.

In such a way, the sheet bundle is joined to the cover sheet in a form of an inverted T character, and the spine abutment plate 59 turns into a state of supporting the cover sheet in a backup manner. Subsequently, the spine folding plates 58 are moved from the retreating positions to the operating positions, and then the left and right spine folding plates 58*a* and 58*b* press-mold a spine portion of the cover sheet. In this process, the adhesive with which the sheet bundle is coated is solidified, and the cover sheet and the sheet bundle are stitched together.

Next, a description is made of a configuration of the above-mentioned trimming cutting portion B4.

The sheet bundle stitched with the cover sheet into a book form as described above is sent by the sheet bundle conveying device 55 to folding rolls 60 located downstream thereof. Note that, at this time, the spine abutment plate 59 and the spine folding plates 58*a* and 58*b* individually retreat to the retreating positions. In the bookbinding route T4, a cutting position P5 is provided downstream of the cover sheet stitching position P4, and a cutting device 61 is disposed at the cutting position P5.

As illustrated in FIG. 2, the cutting device 61 includes a rotation table 62, a cut edge press machine 63 and a cutting blade 64, which are sequentially arranged on a downstream side in the bookbinding route T4. The rotation table 62 grips the sheet bundle sent from the folding rolls 60, and changes the orientation thereof. Simultaneously with changing the orientation, the rotation table 62 conveys the lower end edge of the sheet bundle to the cutting position P5 so as to form a preset cutting margin therein. For this purpose, a turning motor and an elevating motor are provided in the rotation table 62.

At the cutting position P5, the cutting blade 64 and a cutter motor Mc that drives the cutting blade 64 are provided, and cut a predetermined amount of the sheet bundle. The cutting blade 64 in FIG. 2 includes a flat-blade cutter, is supported on the apparatus frame so as to be movable between a waiting posture of retreating from the bookbinding route T4 and a cutting posture illustrated in FIG. 2, and cuts the sheet bundle in a process of reciprocating by the cutter motor Mc.

Next, a description is made of the above-mentioned containing stack portion B5. On a downstream side of the cutting blade 64, there are arranged: for example, box-like stacker 65 and chip disposal tray 91 as stack portions which stack the sheet bundles subjected to the bookbinding by the cover sheet stitching device; and for example, a pair of conveying rolls 90 as sheet bundle discharging devices which discharge the sheet bundles subjected to the coating process of the adhesive to the stacker 65. Then, the sheet bundles subjected to the cutting process are discharged to the stacker 65 by the conveying rolls 90. Further, the chip disposal tray 91 is provided adjacent to the stacker 65, and contains paper chips cut by the cutting blade 64 located upstream thereof. Note that the paper chips cut by the cutting blade 64 are guided to the chip disposal tray 91 by a sweeper member 98 driven to swing by a drive motor (not shown).

Figure 6:
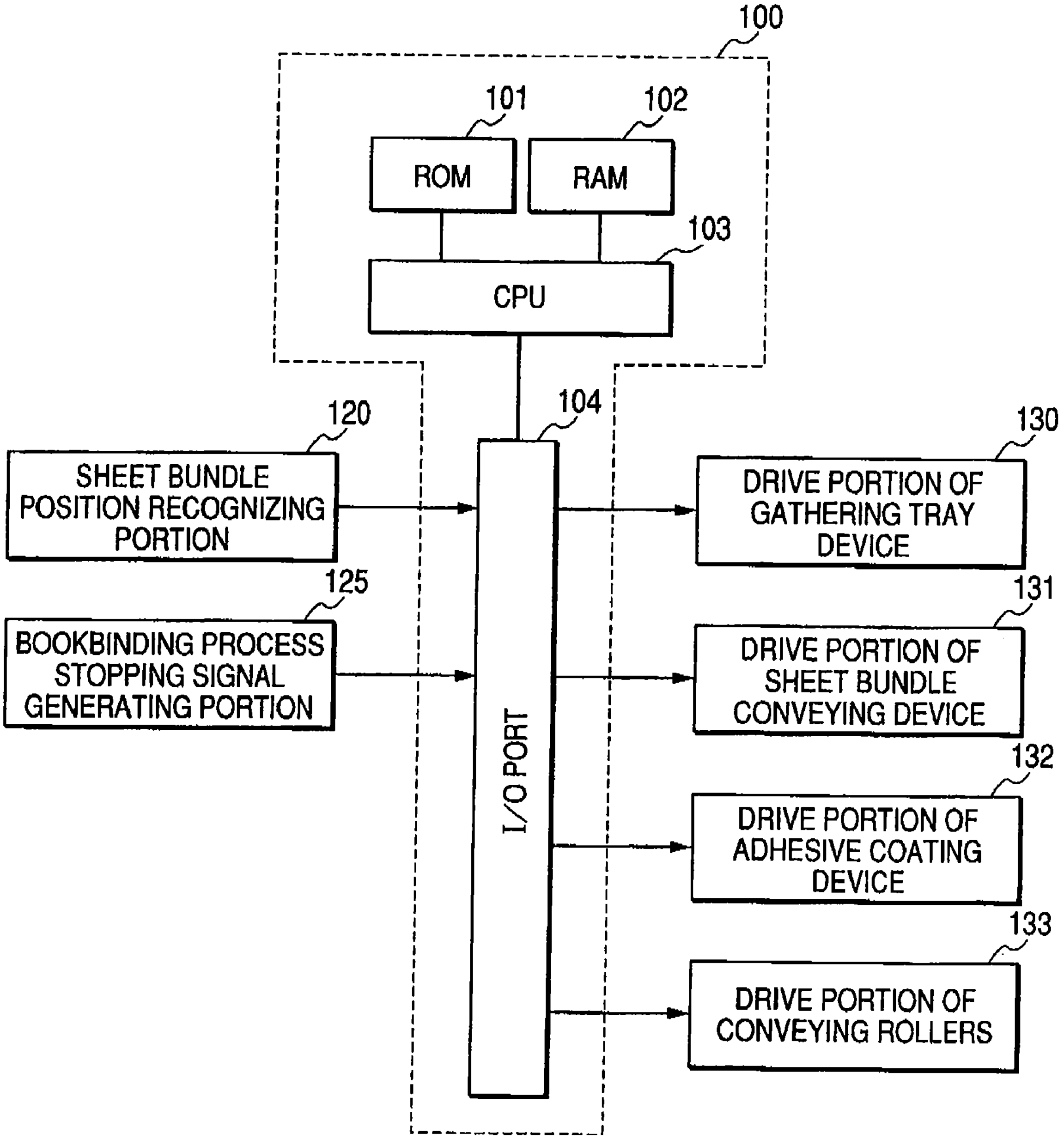
FIG. 6 is a block diagram illustrating a configuration of a control device.
Figure 7:
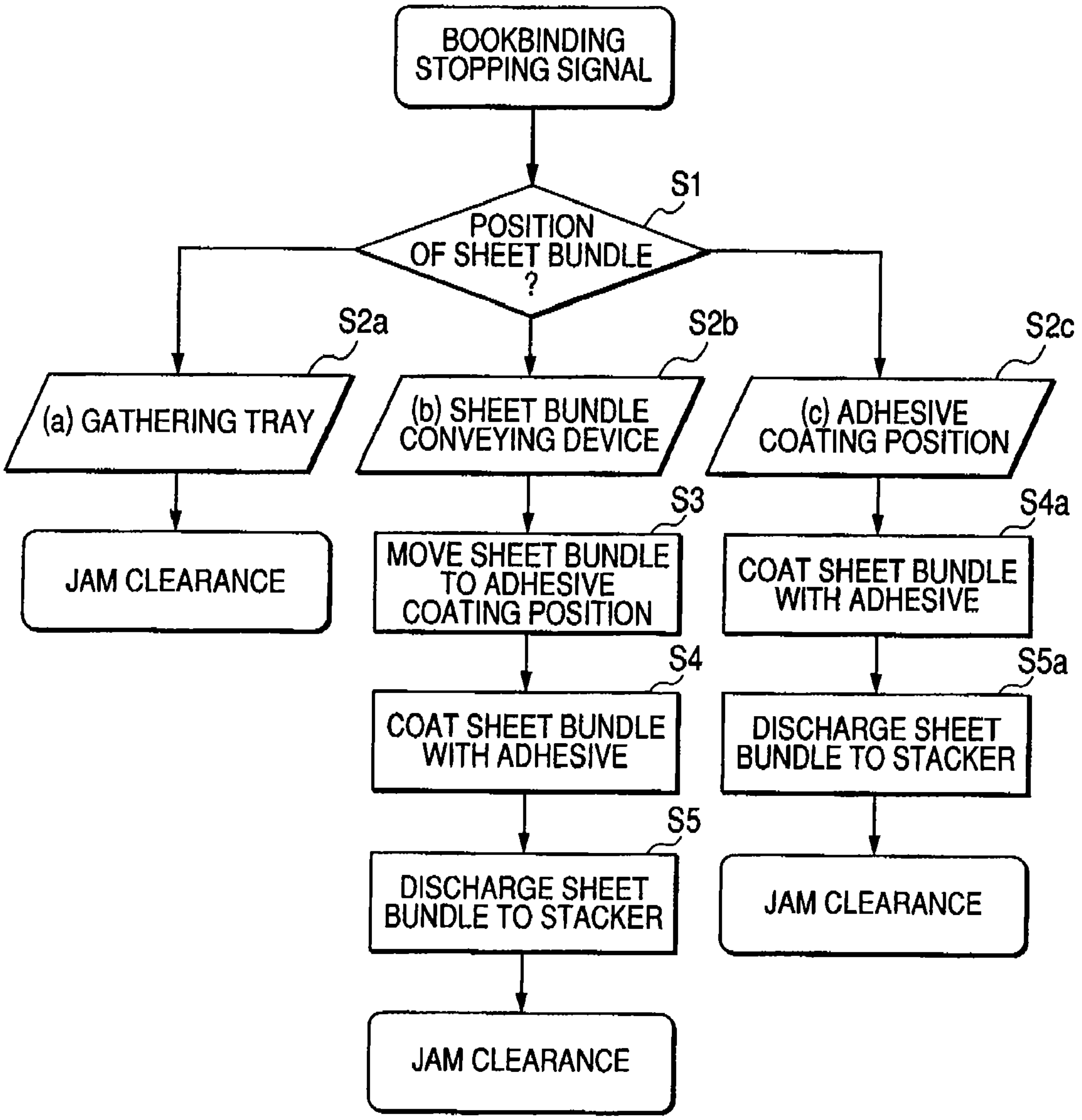
FIG. 7 is a flowchart illustrating an example of a process procedure in a case of an occurrence of a bookbinding stopping signal.

With reference to FIG. 6 and FIG. 7, a description is specifically made of a control device that implements a process (referred to as a bookbinding stopping process) in the case where a bookbinding stopping signal is generated during a bookbinding process operation in the bookbinding apparatus structured as described above, and of an example of a process procedure by the control device. FIG. 6 is a block diagram illustrating a configuration of the control device, and FIG. 7 is a flowchart illustrating an example of the process procedure. Note that the block diagram illustrated in FIG. 6 schematically illustrates only constituents necessary to implement the bookbinding stopping process.

A control device 100 includes a microcomputer disposed on a circuit board, and includes: a ROM 101 that stores a program for the process operation; a RAM 102 that functions as a temporal storage device at the time of a control operation; and a CPU 103 that executes the control operation according to the program. To the CPU 103, a bundle position detection signal and a bookbinding stopping signal are input from a sheet bundle position recognizing portion 120 and a bookbinding process stopping signal generating portion 125, respectively through an I/O port 104. Meanwhile, the CPU 103 outputs drive control signals individually to a drive portion 130 of the above-mentioned gathering tray device, a drive portion 131 of the above-mentioned sheet bundle conveying device, a drive portion 132 of the above-mentioned adhesive coating device, and a drive portion 133 of the variety of conveying rolls which convey the sheet bundle to the stacker 65.

In this case, the control device 100 may have only a function to implement the control operation at the time of the bookbinding stopping process, or may also have a function to implement a control operation for controlling a usual bookbinding process. Further, for example, the control device 100 may be structured as a one-chip CPU in which the constituents such as the above-mentioned ROM 101, RAM 102, CPU 103, and I/O port 104 are integrated.

In the above-mentioned configuration, the sheet bundle position recognizing portion 120 includes members which generate signals for grasping a current position of the sheet bundle, and for example, includes: an empty sensor installed on the gathering tray 42; and a variety of sensors which detect the movement of the gathering tray 42, the movement of the sheet bundle conveying device 55, and the like; or a timer that specifies the position of the sheet bundle in terms of time; and the like. Further, the bookbinding process stopping signal generating portion 125 includes a member that generates the bookbinding stopping signal when the bookbinding process cannot be implemented for any reason, and for example, includes a variety of sensors which detect that the cover sheet runs out, and detect that abnormality such as sheet jam has occurred in the conveying routes.

Further, the drive portion 130 of the gathering tray device includes a drive member driven for conveying the sheet bundle, which is present on the gathering tray device, to the sheet bundle conveying device 55 side, and for example, includes: a drive motor that drives the gathering tray 42 between the gathering position P1 and the taking-out position P2 (refer to FIG. 1); and the like. Further, the drive portion 131 of the sheet bundle conveying device includes a drive member driven for conveying the sheet bundle, which is present on the sheet bundle conveying device 55, to the adhesive coating position P3 (refer to FIG. 1), and for example, includes: the roll rotation motor MR of the coating roll 67

(refer to FIG. 3A) a turning motor that drives the above-mentioned gripper members to turn; the grip motor that drives the gripper members; and the like. Further, the drive portion 132 of the adhesive coating device includes a drive member driven for implementing the adhesive coating for the sheet bundle, and for example, includes: the shift motor MS (refer to FIG. 5) that reciprocates the adhesive container 66; and the like. Further, the conveying roll drive portion 133 includes a drive member driven for transferring the sheet bundle, for which the adhesive coating is finished, to the stacker 65, and for example, includes a drive motor that drives the conveying rolls such as the above-mentioned conveying rolls 90.

Next, with reference to FIG. 7, a description is made of the example of the process procedure in the case where the bookbinding stopping signal is generated during the bookbinding process operation.

When the bookbinding stopping signal is input to the above-mentioned control device 100, first, the current position where the sheet bundle is present is detected by an input signal from the sheet bundle position recognizing portion 120 (Step S1).

When it has been detected in the detection of Step S1 that the sheet bundle is located on the gathering tray 42 (Step S2*a*), the operation is stopped without doing any other actions. At this time, since the sheets (the sheet bundle) in process are located on the gathering tray 42, an operator can implement jam clearance from above the apparatus without doing any other actions.

Meanwhile, when it has been detected in the detection of Step S1 that the sheet bundle is located on the sheet bundle conveying device 55 (Step S2*b*), the drive portion 131 of the sheet bundle conveying device is driven, and the sheet bundle is moved to the adhesive coating position (Step S3). Then, the drive of the drive portion 131 of the sheet bundle conveying device is stopped, and the drive portion 132 of the adhesive coating device is driven, whereby the sheet bundle is coated with the adhesive (Step S4). That is, in the case where the control device 100 receives the stopping signal for the bookbinding process before the sheet bundle is subjected to the adhesive coating process by the adhesive coating device, the adhesive coating process is executed for the sheet bundle in process. The adhesive coating process may be executed for the sheet bundle that has been already conveyed from the gathering tray 42 as described above, or may be executed for the sheet bundle at a stage of being located on the gathering tray 42 as described later.

After that, the drive of the drive portion 132 of the adhesive coating device is stopped, the conveying roll drive portion 133 is driven, and the sheet bundle is discharged to the stacker 65 without stitching the cover sheet therewith (Step S5). In such a way, the sheet bundle that has been in process in the inside of the apparatus is discharged to the stacker 65 finally in a state of being coated with the adhesive. Accordingly, the operator can open a portion of the stacker and perform the jam clearance, and the operator is free from risks to fall the sheet bundle into the apparatus and to bring the sheet bundle apart randomly, whereby enhancement of operability can be achieved. Further, the high-temperature adhesive coating portion is not located in the vicinity of the operator at the time of the jam clearance, and accordingly, safety of the operator can be ensured with ease, and a necessity to install such a member that covers the adhesive coating portion in the apparatus body is eliminated.

Meanwhile, when it has been detected in the detection of Step S1 that the sheet bundle is located on the adhesive coating position (and the adhesive is not coated yet thereon) (Step S2*c*), the drive portion 132 of the adhesive coating device is driven without doing any other actions in a similar way to the procedure of Step S4, and the sheet bundle is coated with the adhesive (Step S4*a*). After that, the drive of the drive portion 132 of the adhesive coating device is stopped, and the conveying roll drive portion 133 is driven, whereby the sheet bundle is discharged to the stacker 65 (Step S5*a*). In such a way, the sheet bundle that has been in process in the inside of the apparatus is discharged to the stacker 65 finally in the state of being coated with the adhesive. Accordingly, the operator can open the portion of the stacker and perform the jam clearance, whereby the above-mentioned functions and effects can be obtained.

As described above, the present invention has a feature in that, in the case of receiving the stopping signal for the bookbinding process before the sheet bundle is subjected to the adhesive coating process by the adhesive coating device, the adhesive coating process is executed for the sheet in process. In such a way, the sheets are prevented from turning into the state of being brought apart randomly in the apparatus, whereby the enhancement of the operability for the jam clearance and the like can be achieved.

Although the description has been made above of the embodiment of the present invention, the present invention is not limited to the above-mentioned embodiment, and for example, it is possible to modify the present invention in various ways as below.

In the above-mentioned embodiment, in the case where the sheets (the sheet bundle) are present on the gathering tray 42, the procedure is implemented, in which the process is stopped without doing any other actions, and the sheets (the sheet bundle) are taken out of the gathering tray 42. That is, the above-mentioned embodiment is configured so as to implement the adhesive coating process for the sheet bundle that has been already conveyed from the gathering tray 42. However, if the sheets of which number is equivalent to the defined number for the bookbinding is not present on the gathering tray 42, and two or more sheets are present thereon, the adhesive coating process may be implemented for such multiple sheets of which number is smaller than the defined number as in the case of the above-mentioned Step S2*b* and Step S2*c*, and the sheets may be discharged to the stacker 65. Further, in the case where one sheet is present on the gathering tray 42, the sheet may be directly discharged to the stacker 65 without implementing the adhesive coating process therefor. In the case where the defined number of sheets are present, the adhesive coating process may be implemented therefor, and the sheets may be discharged to the stacker 65 without doing any other actions.

Further, though the sheet bundle subjected to the adhesive coating process is discharged to the stacker 65 in the above-mentioned embodiment, a control may be performed so as to stop the process at the stage where the adhesive coating process has been executed, or alternatively, depending on contents of the stop of the bookbinding, a control may be performed so as to stop the process at the stage where the cover sheet has been stitched with the sheet bundle.

According to the above-mentioned embodiment, even in the case where the operation of the bookbinding process is stopped, the processes up to the adhesive coating process are executed, whereby the sheets are formed into the bundle. Accordingly, the enhancement of the operability for the jam clearance and the like can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-155166, filed Jun. 12, 2007, which is hereby incorporated by reference herein in its entirety.

What is claimed is:

1. A bookbinding apparatus comprising:

a gathering tray device that collates sheets sequentially fed thereto into a sheet bundle;

a sheet bundle conveying device that grips the sheet bundle collated by the gathering tray device and conveys the sheet bundle to an adhesive coating position located downstream of the gathering tray device;

an adhesive coating device that coats the sheet bundle located at the adhesive coating position with an adhesive; and a control device that controls a bookbinding process executed by the sheet bundle conveying device and the adhesive coating device, wherein, (i) upon receiving a bookbinding process stopping signal in a state where one sheet is placed on the gathering tray device, the control device does not allow the adhesive coating device to perform an adhesive coating process for the one sheet, and (ii) upon receiving the bookbinding process stopping signal in a state where two or more sheets are placed on the gathering tray device, the control device controls the sheet bundle conveying device to convey the two or more sheets to the adhesive coating position and controls the adhesive coating device to coat the sheet bundle in process with the adhesive.

2. A bookbinding apparatus according to claim 1, further comprising:

a cover sheet stitching device that stitches a cover sheet onto the sheet bundle;

a stacking portion on which the sheet bundle stitched with the cover sheet by the cover sheet stitching device is stacked; and a sheet bundle discharging device that discharges the sheet bundle coated with the adhesive to the stacking portion, wherein the control device controls the cover sheet stitching device and the sheet bundle discharging device, and wherein, (i) upon receiving the bookbinding process stopping signal before the sheet bundle is coated with the adhesive by the adhesive coating device and in a state where one sheet is placed on the gathering tray device, the control device controls the sheet bundle conveying device to convey the one sheet to the adhesive coating position, and does not allow the adhesive coating device to perform the adhesive coating process for the one sheet, and controls the sheet bundle discharging device to discharge the one sheet to the stacking portion, and (ii) upon receiving the bookbinding process stopping signal before the two or more sheets are coated with the adhesive by the adhesive coating device, the control device controls the adhesive coating device to coat the two or more sheets in process with the adhesive and the control device controls the sheet bundle discharging device to discharge to the stacking portion the two or more sheets coated with the adhesive without being stitched with the cover sheet.

3. A bookbinding apparatus according to claim 1, wherein the control device controls the adhesive coating device to coat the two or more sheets in process with the adhesive, the two or more sheets having been already conveyed from the gathering tray device.

4. An image forming system comprising:

an image forming apparatus including an image forming portion that sequentially forms images on sheets, and a discharging device that discharges the sheet on which the image is formed; and a bookbinding apparatus according to claim 1, wherein the image forming apparatus and the bookbinding apparatus are connected to each other so that the sheets can be sequentially discharged from the discharging device toward the gathering tray device of the bookbinding apparatus.

* * * * *